US011950076B2

(12) United States Patent
Mao et al.

(10) Patent No.: US 11,950,076 B2
(45) Date of Patent: Apr. 2, 2024

(54) SPEAKER

(71) Applicant: AAC Microtech (Changzhou) Co., Ltd., Changzhou (CN)

(72) Inventors: Lubin Mao, Shenzhen (CN); Dong Lu, Shenzhen (CN); Jie Ma, Shenzhen (CN); Ziang Li, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 195 days.

(21) Appl. No.: 17/743,481

(22) Filed: May 13, 2022

(65) Prior Publication Data

US 2023/0283956 A1 Sep. 7, 2023

(30) Foreign Application Priority Data

Mar. 2, 2022 (CN) ......................... 202220442469.0

(51) Int. Cl.

| | |
|---|---|
| ***H04R 9/06*** | (2006.01) |
| ***H04R 1/02*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 1/025* (2013.01); *H04R 7/12* (2013.01); *H04R 7/18* (2013.01); *H04R 9/025* (2013.01); *H04R 9/045* (2013.01); *H04R 2400/11* (2013.01)

(58) Field of Classification Search

CPC ...... H04R 9/025; H04R 9/06; H04R 2400/11; H04R 2499/13; H04R 9/04; H04R 1/22; H04R 1/24; H04R 2307/027; H04R 2499/11; H04R 2499/15; H04R 9/02; H04R 9/022; H04R 9/027; H04R 9/046; H04R 1/025; H04R 1/026; H04R 1/06; H04R 1/2873; H04R 2209/022; H04R 2209/024; H04R 2209/026; H04R 2460/11; H04R 7/12; H04R 7/18; H04R 9/043; H04R 9/045; H04R 9/063

USPC .................................................. 381/332, 331

See application file for complete search history.

(56) References Cited

U.S. PATENT DOCUMENTS 8,995,704 B2 * 3/2015 Huang .................. H04R 9/043 381/396
10,187,730 B1 * 1/2019 Zhu ....................... G06F 1/1688

(Continued)

*Primary Examiner* — Lun-See Lao
(74) *Attorney, Agent, or Firm* — W&G Law Group

(57) ABSTRACT

A speaker includes: a housing including a ring-shaped frame, a front cover and a bottom shell; a vibration system and a magnetic circuit system, the vibration system including a diaphragm fixed on the frame, a voice coil support fixed on the diaphragm and a voice coil supported by the voice coil support, the magnetic circuit system including a first magnetic yoke fixed on the front cover and a magnet assembly fixed on the first magnetic yoke. A first opening is provided to penetrate a center portion of the diaphragm, and the diaphragm includes an inner edge enclosing the first opening and an outer edge fixed to the frame, the magnetic circuit system extends through the first opening, the housing further includes an extension portion extending from the front cover toward the diaphragm and surrounding the magnetic circuit system, and the inner edge of the diaphragm is fixed to the extension.

12 Claims, 9 Drawing Sheets

(56) References Cited

U.S. PATENT DOCUMENTS

| | | | | |
|---|---|---|---|---|
| 11,240,605 | B2 * | 2/2022 | Song | H04R 9/025 |
| 11,570,534 | B2 * | 1/2023 | Song | H04R 1/026 |
| 2018/0124520 | A1 * | 5/2018 | Schoeffmann | H04R 9/06 |
| 2020/0382874 | A1 * | 12/2020 | Fukada | H04R 7/26 |
| 2022/0210572 | A1 * | 6/2022 | Xiao | H04R 1/44 |

* cited by examiner

A-A

B-B

C-C

SPEAKER

TECHNICAL FIELD

The present disclosure relates to an electro-acoustic device, in particular to a speaker used in portable electronic products.

BACKGROUND

Speaker is a transducer device that converts electrical signals into acoustic signals, which is widely used in portable electronic devices such as mobile phones and laptops.

With the development of technology, portable electronic devices are also developing in the direction of thinness and lightness, which requires that electronic components including speaker in portable electronic devices also have a smaller thickness to adapt to the trend of thinning.

The speaker in the related art comprises a frame, a vibration system mainly composed of a diaphragm and a voice coil and a magnetic circuit system composed of a magnetic yoke and a magnet. Wherein, the vibration system and the magnetic circuit system are arranged at intervals along the vibration direction, the space for the vibration system is partially coincident with the space for the magnetic circuit system. Specifically, the voice coil is inserted and reciprocates in the magnetic gap after being energized, thereby driving the diaphragm to vibrate and sound.

Although the voice coil in the related art will not collide with the magnetic yoke during the vibration, it can be seen that the moving distance of the voice coil along the vibration direction is limited by the height of the magnetic gap in the magnetic circuit system, and the vibration amplitude is limited. In addition, the height between the voice coil and the magnetic yoke along the vibration direction is not only underutilized, but also makes the magnetic circuit system thicker along the vibration direction, which increases the height of the device along the vibration direction, and limits the development of the thickness of the speaker in the direction of thinning.

Therefore, it is a need to provide an improved speaker to solve the above problems.

SUMMARY

In the view of the above, the present disclosure provides a speaker with smaller thickness, better performance of the magnetic circuit system, and better acoustic performance.

In order to achieve the objective mentioned above, the present disclosure discloses a speaker comprising: a housing comprising a ring-shaped frame, a front cover and a bottom shell, the front cover and the bottom shell being fixed to the frame and spaced from each other, the frame, the front cover and the bottom shell enclosing a receiving space; a vibration system for generating sound and a magnetic circuit system with a magnetic gap received in the receiving space, the vibration system comprising a diaphragm fixed on the frame and vibrating along a vibration direction, a voice coil support fixed on the diaphragm and a voice coil inserted into the magnetic gap by the voice coil support, the magnetic circuit system comprising a first magnetic yoke fixed on the front cover and a magnet assembly fixed on the first magnetic yoke; wherein, a first opening is provided to penetrate a center portion of the diaphragm along the vibration direction, and the diaphragm comprises an inner edge enclosing the first opening and an outer edge fixed to the frame, the magnetic circuit system extends through the first opening along the vibration direction and is spaced from the inner edge, the housing further comprises an extension portion extending from the front cover toward the diaphragm and surrounding the magnetic circuit system at intervals, and the inner edge of the diaphragm is fixed to the extension.

As an improvement, the voice coil support comprises a first support portion fixed on the diaphragm, a second support portion bending from the first support portion and extending along a direction away from the diaphragm and a third support portion extending from an end of the second support portion away from the first support portion toward the magnetic circuit system, the voice coil is fixed on a side of the third support portion facing the diaphragm.

As an improvement, the magnet assembly comprises a first main magnet fixed on the first magnetic yoke and a first secondary magnet fixed on the first magnetic yoke and located on a peripheral side of the first main magnet at an interval, the interval between the first main magnet and the first secondary magnet is formed as the magnetic gap.

As an improvement, a second opening is provided to penetrate the third support portion of the voice coil support along the vibration direction, and a projection of the first main magnet along the vibration direction falls into the second opening.

As an improvement, a third opening is provided to penetrate the third support portion of the voice coil support along the vibration direction, and a projection of the first secondary magnet along the vibration direction falls into the third opening.

As an improvement, the magnetic circuit system further comprises a first pole core fixed on a side of the first main magnet away from the first magnetic yoke and a second main magnet fixed on a side of the first pole core away from the first main magnet, a surface of the second main magnet away from the first pole core abuts against the bottom shell.

As an improvement, the magnetic circuit system further comprises a second pole core fixed on a side of the first secondary magnet away from the first magnetic yoke and a second secondary magnet fixed on a side of the second pole core away from the first secondary magnet, a surface of the second secondary magnet away from the second pole core abuts against the bottom shell, the bottom shell is formed as a second magnetic yoke of the magnetic circuit system.

As an improvement, the first main magnet and the second main magnet are both magnetized along the vibration direction and poles thereof with a same polarity are opposite to each other, and the first secondary magnet and the second secondary magnet are both magnetized along the vibration direction and poles thereof with a same polarity are opposite to each other, the first main magnet and the first secondary magnet are magnetized along opposite directions.

As an improvement, the diaphragm further comprises an inner suspension ring portion surrounding the inner edge, a middle connecting portion surrounding the inner suspension ring portion and an outer suspension ring portion surrounding the middle connecting portion, the outer edge surrounds the outer suspension ring portion and is fixed to the frame.

As an improvement, the first support portion is fixed to the middle connecting portion, the first support portion and the third support portion both extend perpendicular to the vibration direction, the second support portion extends along the vibration direction.

As an improvement, a fourth opening corresponding to the first opening is provided to penetrate the front cover along the vibration direction, and the front cover comprises an opening edge portion enclosing the fourth opening, the extension portion bends from the opening edge portion and extends along the vibration direction to be fixedly connected with the inner edge of the diaphragm.

As an improvement, the first magnetic yoke is accommodated in the fourth opening and fixed to the front cover

DESCRIPTION OF EMBODIMENTS

Figure 1:
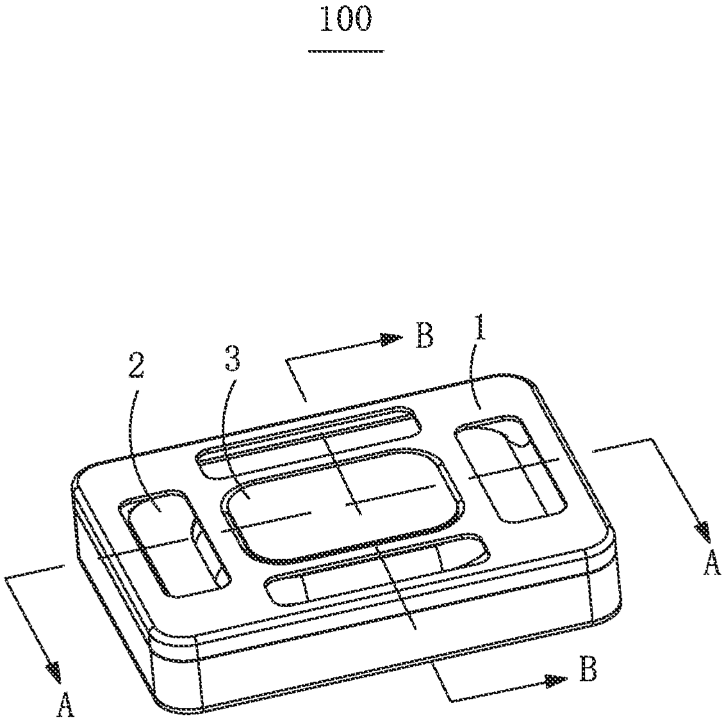
FIG. 1 is an isometric view of a speaker in accordance with an exemplary embodiment of the present disclosure.

The technical solutions in embodiments of the present disclosure will be described clearly and completely below with reference to the accompanying drawings in the embodiments of the present disclosure.

As shown in FIGS. 1-7, the present disclosure discloses a speaker 100. The speaker 100 includes a housing 1 with a receiving space 10, a vibration system 2 received in the receiving space 10 for vibrating and producing sound, and a magnetic circuit system 3 for driving the vibration system 2 to vibrate and produce sound.

Wherein, the housing 1 comprises a ring-shaped frame 11, a front cover 12 and a bottom shell 13. The front cover 12 and the bottom shell 13 are both fixed to the frame 11. The front cover 12 and the bottom shell 13 are arranged at intervals, and respectively fixed at two different ends of the frame 11 to form a receiving space 10 enclosed with the frame 11. The front cover 12 is provided with a sound outlet 121, and the sound produced by the vibration system 2 is transmitted to the outside through the sound outlet 121.

Figure 2:
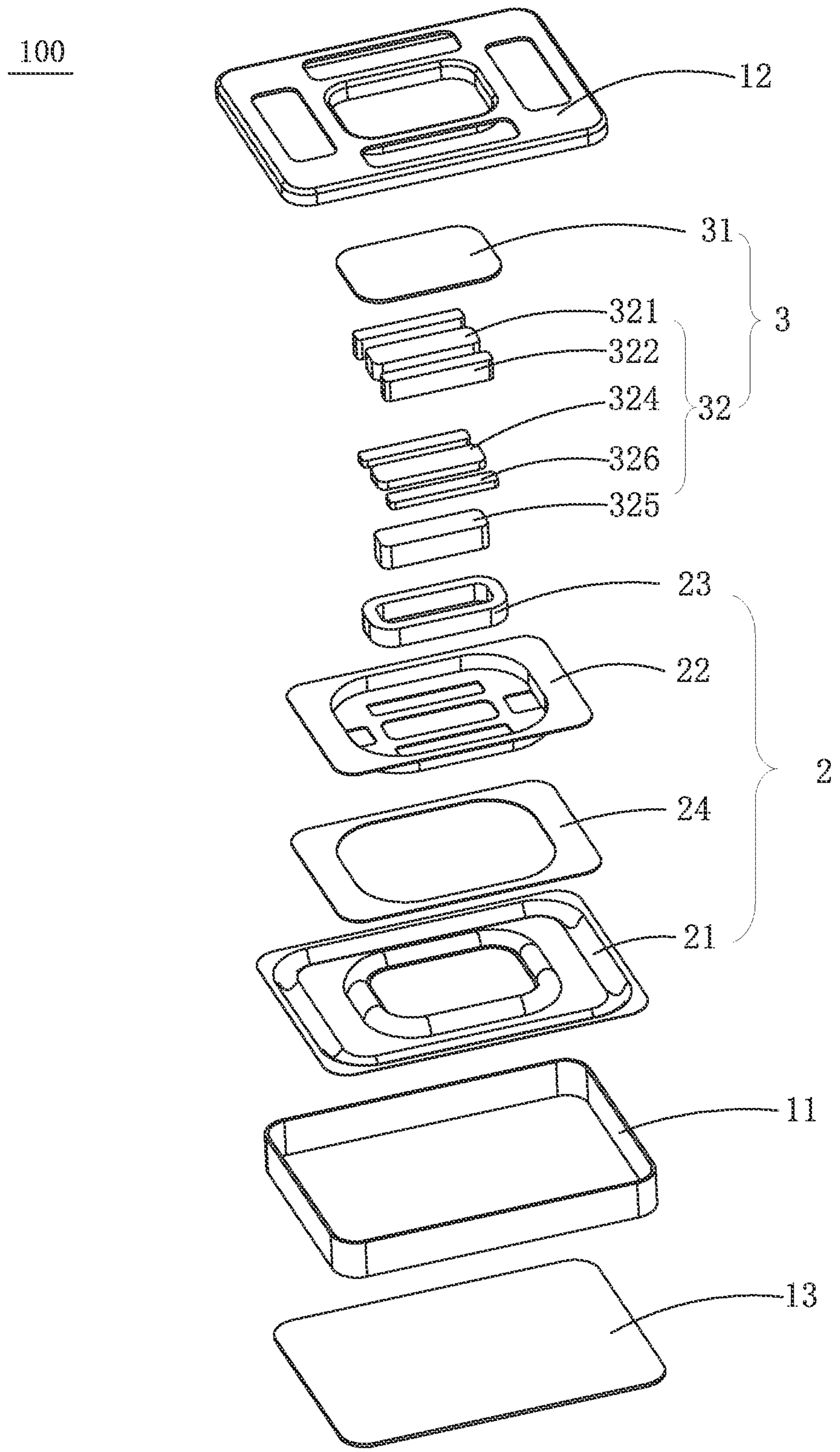
FIG. 2 is an exploded view of the speaker in FIG. 1.
Figure 3:
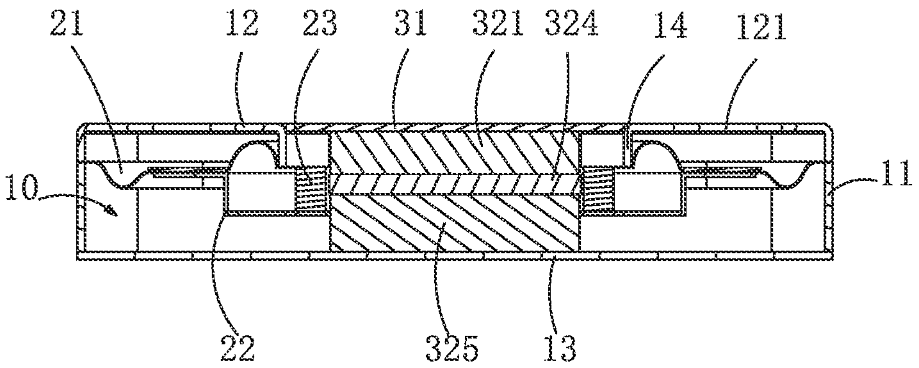
FIG. 3 is a cross-sectional view of the speaker taken along line A-A in FIG. 1.
Figure 4:
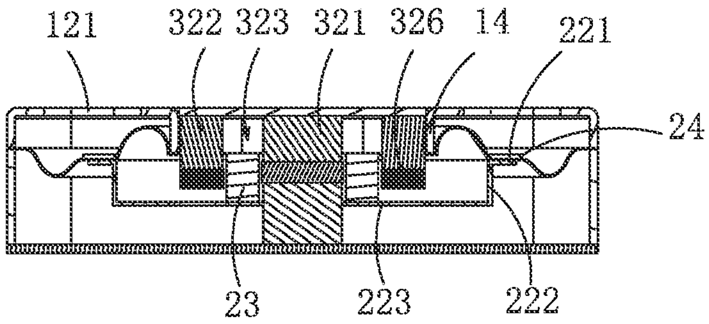
FIG. 4 is a cross-sectional view of the speaker taken along line B-B in FIG. 1.

As shown in FIGS. 2-4, the vibration system 2 comprises a diaphragm 21 fixed to the frame 11, a voice coil support 22 fixed to the diaphragm 21, a voice coil 23 fixed to the voice coil support 22, and a dome 24 fixed to the diaphragm 21.

Figure 5:
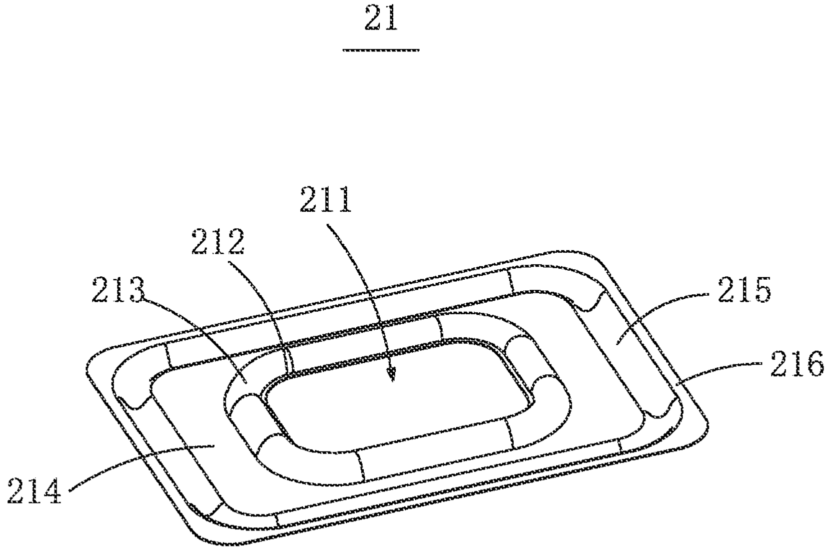
FIG. 5 is an isometric view of a diaphragm in a speaker in accordance with an exemplary embodiment of the present disclosure.

As shown in FIG. 5, the diaphragm 21 is provided with a first opening 211 located in its center portion and penetrating it along the vibration direction. Correspondingly, the diaphragm 21 sequentially comprises an inner edge 212 surrounding the first opening 211, an inner suspension ring portion 213 surrounding the inner edge 212, a middle connecting portion 214 surrounding the inner suspension ring portion 213, an outer suspension ring portion 215 surrounding the middle connecting portion 214, and an outer edge 216 surrounding the outer suspension ring portion 215, the outer edge 216 is fixed to the frame 11. Wherein, the dome 24 is fixed on the surface of the middle connecting portion 214 facing toward the front cover 12.

The magnetic circuit system 3 comprises a first magnetic yoke 31 fixed on the front cover 12 and a magnet assembly 32 fixed on the side of the first magnetic yoke 31 facing the receiving space 10. Specifically, the magnet assembly 32 comprises a first main magnet 321 fixed to the first magnetic yoke 31, a first secondary magnet 322 fixed to the first magnetic yoke 31 and located on the peripheral side of the first main magnet 321. The main magnet 321 and the first secondary magnet 322 are arranged at an interval to form a magnetic gap 323, and the voice coil 23 is inserted into the magnetic gap 323 through the voice coil support 22.

Preferably, the magnet assembly 32 further includes a first pole core 324 fixed on the side of the first main magnet 321 away from the first magnetic yoke 31, and a second main magnet 325 fixed on the side of the first pole core 324 away from the first main magnet 321, the surface of the second main magnet 325 away from the first pole core 324 abuts against the bottom shell 13.

In this embodiment, the magnetic circuit system 32 further includes a second pole core 326 fixed on the side of the first secondary magnet 322 away from the first magnetic yoke 31. In addition, the magnetic circuit system 3 further includes a second magnetic yoke, the bottom shell 13 is formed as the second magnetic yoke, that is the bottom shell 13 is made of a magnetically conductive material, which can converge the magnetic lines of the magnetic circuit system 3 to enhance the magnetic conductivity of the magnetic circuit system 3.

Figure 8:
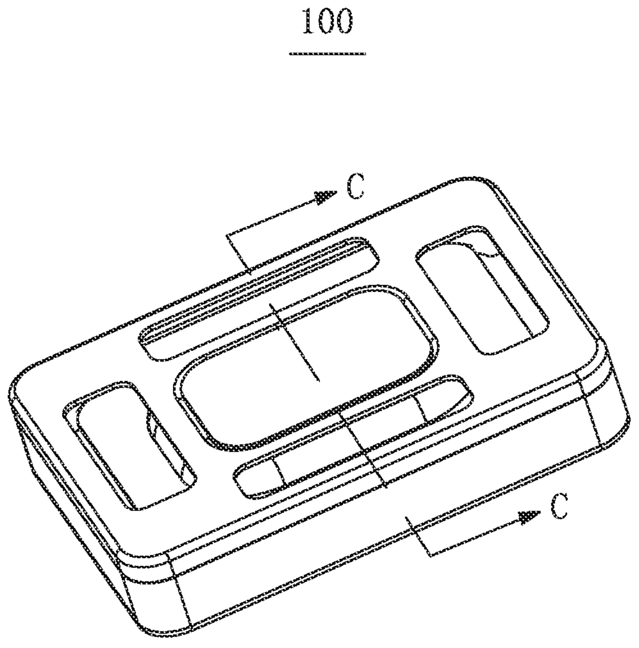
FIG. 8 is an isometric view of a speaker in accordance with another exemplary embodiment of the present disclosure.
Figure 9:
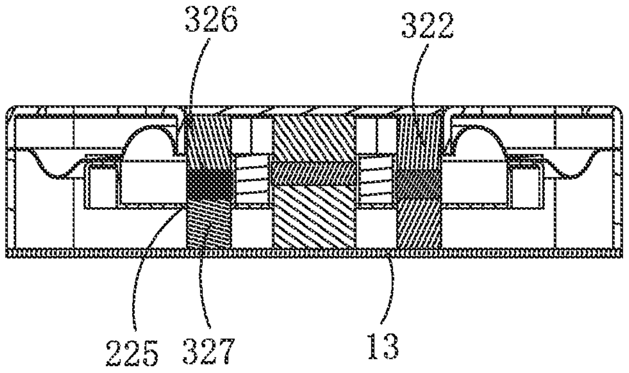
FIG. 9 is a cross-sectional view of the speaker taken along line C-C in FIG. 8.

As shown in FIGS. 8 and 9, In another embodiment of the present disclosure, the magnetic circuit system 3 further includes a second secondary magnet 327 fixed on the side of the second pole core 326 away from the first secondary magnet 322, the surface of the second secondary magnet 327 away from the second pole core 326 abuts against the bottom shell 13, which further enhances the magnetic field performance of the magnetic circuit system 3. Wherein, the first main magnet 321 and the second main magnet 325 are both magnetized along the vibration direction and poles thereof with a same polarity are opposite to each other, the first secondary magnet 322 and the second secondary magnet 327 are both magnetized along the vibration direction and poles thereof with a same polarity are opposite to each other, the first main magnet 321 and the first secondary magnet 322 are magnetized along opposite directions.

In the present disclosure, the first magnetic yoke 31 of the magnetic circuit system 3 is fixed on the front cover 12. The magnetic circuit system 3 extends through the first opening 211 on the diaphragm 21 along the vibration direction and is spaced from the inner edge 212 of the diaphragm 21. In addition, the housing 1 further includes an extension portion 14 extending from the front cover 12 toward the diaphragm 21 and surrounding the magnetic circuit system 3 at intervals, the inner edge 212 of the diaphragm 21 is fixed on the extension portion 14 to support the inner portion of the diaphragm 21. In this embodiment, the extension portion 14 is a continuous ring-shaped structure, and in other embodiments, the extension portion 14 can also be a discontinuous ring-shaped structure with breakpoints.

Figure 6:
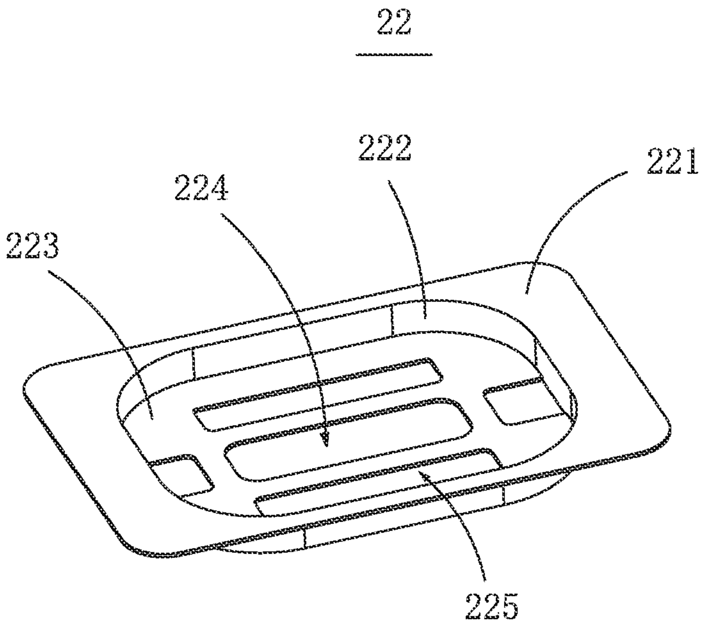
FIG. 6 is an isometric view of a voice coil support in a speaker in accordance with an exemplary embodiment of the present disclosure.
Figure 7:
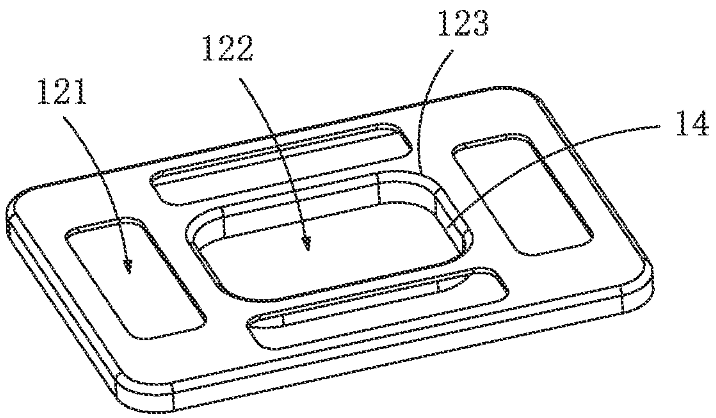
FIG. 7 is an isometric view of a front cover and an extension portion in a speaker in accordance with an exemplary embodiment of the present disclosure.

In addition, as shown in FIG. 6, the voice coil support 22 comprises a first support portion 221 fixed to the diaphragm 21, a second support portion 222 bending from the first support portion 221 and extending along a direction away from the diaphragm 21, and a third support portion 223 extending from one end of the second support portion 222 away from the first support portion 221 toward the magnetic circuit system 3. The voice coil 23 is fixed to the third support portion 223.

Specifically, referring to FIGS. 3 to 7, since the magnetic circuit system 3 extends from the front cover 12 to the bottom shell 13, to prevent the magnetic circuit system 3 affecting the normal operation of the vibration system 2, the third support portion 223 of the voice coil support 22 is provided with a second opening 224 penetrating along the vibration direction, and the projection of the first main magnet 321 along the vibration direction falls into the second opening 224. It can be understood that when the voice coil 23 drives the voice coil support 22 and the diaphragm 21 to vibrate, the second opening 224 can be used to avoid the first main magnet 321 so as to avoid the collision to affect the normal operation of the vibration system 2. Similarly, the third support portion 223 of the voice coil support 22 is further provided with a third opening 225 penetrating along the vibration direction, and the projection of the first secondary magnet 322 along the vibration direction falls into the third opening 225, which is the similar with the second opening 224, and the function of the third opening 225 is also used to avoid the first secondary magnet 322. The second opening 224 and the third opening 225 are arranged at an interval from each other.

Preferably, the projected areas of the first main magnet 321, the first pole core 324 and the second main magnet 325 along the vibration direction are equal, correspondingly, the projected areas of the first secondary magnet 322, the second pole core 326 and the second secondary magnet 327 along the vibration direction are equal.

Preferably, the first support portion 221 of the voice coil support 22 is fixed to the middle connecting portion 214 of the diaphragm 21, and the extension directions of the first support portion 221 and the third support portion 223 are both perpendicular to the vibration direction, and the second support portion 222 extends in the vibration direction.

In this embodiment, the front cover 12 is provided with a fourth opening 122 penetrating along the vibration direction, the fourth opening 122 corresponds to the first opening 211 on the diaphragm 21. The front cover 21 includes an opening edge portion 123 surrounding the fourth opening 122, the extension portion 14 bends from the opening edge portion 123 and extends along the vibration direction to be fixedly connected to the inner edge 212 of the diaphragm 21. It can be understood that the first magnetic yoke 31 of the magnetic circuit system 3 is accommodated in the fourth opening 122 and fixed to the front cover 12.

The present disclosure provides a speaker, which comprises a housing, a vibration system and a magnetic circuit system. The housing comprises a frame, a front cover and a bottom shell, wherein the front cover and the bottom shell are both fixed to the frame and arranged at intervals from each other. The magnetic circuit system comprises a first magnetic yoke fixed on the front cover and a magnet assembly fixed on the first magnetic yoke. The vibration system comprises a diaphragm fixed on the frame, a voice coil support fixed on the diaphragm, and a voice coil inserted in the magnetic gap by the voice coil support. Wherein, the diaphragm is provided with a first opening located in the center portion and penetrate it along the vibration direction, and the diaphragm further comprises an inner edge enclosing the first opening and an outer edge fixed to the frame, the magnetic circuit system extends through the first opening along the vibration direction and is arranged at intervals from the inner edge. The housing further comprises an extension portion extending from the front cover toward the diaphragm and surrounding the magnetic circuit system at intervals, and the inner edge of the diaphragm is fixed to the extension. By arranging the first opening on the diaphragm, the magnetic circuit system and the diaphragm are independently arranged on a plane perpendicular to the vibration direction, and the voice coil is inserted into the magnetic gap through the voice coil support, so that the magnetic circuit space and the vibration space are truly separated from each other, and the vibration system can still maintain sufficient capacity when the thickness of the device is reduced, which is beneficial to the speaker having good acoustic performance and meeting the design requirements of being lighter and thinner.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:

a housing comprising a ring-shaped frame, a front cover and a bottom shell, the front cover and the bottom shell being fixed to the frame and spaced from each other, the frame, the front cover and the bottom shell enclosing a receiving space;

a vibration system for generating sound and a magnetic circuit system with a magnetic gap received in the receiving space, the vibration system comprising a diaphragm fixed on the frame and vibrating along a vibration direction, a voice coil support fixed on the diaphragm and a voice coil inserted into the magnetic gap by the voice coil support, the magnetic circuit system comprising a first magnetic yoke fixed on the front cover and a magnet assembly fixed on the first magnetic yoke;

wherein, a first opening is provided to penetrate a center portion of the diaphragm along the vibration direction, and the diaphragm comprises an inner edge enclosing the first opening and an outer edge fixed to the frame, the magnetic circuit system extends through the first opening along the vibration direction and is spaced from the inner edge, the housing further comprises an extension portion extending from the front cover toward the diaphragm and surrounding the magnetic circuit system at intervals, and the inner edge of the diaphragm is fixed to the extension.

2. The speaker described as claim 1, wherein the voice coil support comprises a first support portion fixed on the diaphragm, a second support portion bending from the first support portion and extending along a direction away from the diaphragm and a third support portion extending from an end of the second support portion away from the first support portion toward the magnetic circuit system, the voice coil is fixed on a side of the third support portion facing the diaphragm.

3. The speaker described as claim 2, wherein the magnet assembly comprises a first main magnet fixed on the first magnetic yoke and a first secondary magnet fixed on the first magnetic yoke and located on a peripheral side of the first main magnet at an interval, the interval between the first main magnet and the first secondary magnet is formed as the magnetic gap.

4. The speaker described as claim 3, wherein a second opening is provided to penetrate the third support portion of the voice coil support along the vibration direction, and a projection of the first main magnet along the vibration direction falls into the second opening.

5. The speaker described as claim 4, wherein a third opening is provided to penetrate the third support portion of the voice coil support along the vibration direction, and a projection of the first secondary magnet along the vibration direction falls into the third opening.

6. The speaker described as claim 5, wherein the magnetic circuit system further comprises a first pole core fixed on a side of the first main magnet away from the first magnetic yoke and a second main magnet fixed on a side of the first pole core away from the first main magnet, a surface of the second main magnet away from the first pole core abuts against the bottom shell.

7. The speaker described as claim 6, wherein the magnetic circuit system further comprises a second pole core fixed on a side of the first secondary magnet away from the first magnetic yoke and a second secondary magnet fixed on a side of the second pole core away from the first secondary magnet, a surface of the second secondary magnet away from the second pole core abuts against the bottom shell, the bottom shell is formed as a second magnetic yoke of the magnetic circuit system.

8. The speaker described as claim 7, wherein the first main magnet and the second main magnet are both magnetized along the vibration direction and poles thereof with a same polarity are opposite to each other, and the first secondary magnet and the second secondary magnet are both magnetized along the vibration direction and poles thereof with a same polarity are opposite to each other, the first main magnet and the first secondary magnet are magnetized along opposite directions.

9. The speaker described as claim 8, wherein the diaphragm further comprises an inner suspension ring portion surrounding the inner edge, a middle connecting portion surrounding the inner suspension ring portion and an outer suspension ring portion surrounding the middle connecting portion, the outer edge surrounds the outer suspension ring portion and is fixed to the frame.

10. The speaker described as claim 9, wherein the first support portion is fixed to the middle connecting portion, the first support portion and the third support portion both extend perpendicular to the vibration direction, the second support portion extends along the vibration direction.

11. The speaker described as claim 1, wherein a fourth opening corresponding to the first opening is provided to penetrate the front cover along the vibration direction, and the front cover comprises an opening edge portion enclosing the fourth opening, the extension portion bends from the opening edge portion and extends along the vibration direction to be fixedly connected with the inner edge of the diaphragm.

12. The speaker described as claim 11, wherein the first magnetic yoke is accommodated in the fourth opening and fixed to the front cover.

* * * * *